Dec. 12, 1950 D. L. HINGS 2,533,802

SELECTIVE AMPLIFIER

Filed Aug. 6, 1945 2 Sheets-Sheet 1

INVENTOR
Donald L. Hings
BY Spaulding and Kraft
ATTORNEYS.

Dec. 12, 1950 D. L. HINGS 2,533,802

SELECTIVE AMPLIFIER

Filed Aug. 6, 1945 2 Sheets-Sheet 2

INVENTOR
Donald L. Hings
BY Shoedling and Kost
ATTORNEYS.

Patented Dec. 12, 1950

2,533,802

UNITED STATES PATENT OFFICE 2,533,802

SELECTIVE AMPLIFIER

Donald L. Hings, Ottawa, Ontario, Canada, assignor, by mesne assignments, to Cornell-Dubilier Electric Corporation, South Plainfield, N. J., a corporation of Delaware Application August 6, 1945, Serial No. 609,267
In Canada July 20, 1945

7 Claims. (Cl. 179—171)

My invention relates in general to high frequency amplifiers and more particularly to a high frequency selective amplifier.

An object of my invention is the provision, in an amplifier circuit, of a localized resonant circuit which has a high Q and which receives energy from the incoming carrier waves, whereby the localized circuit is adapted to influence the amplifier tubes in such fashion as to cause the output of the amplifier circuit to be highly selective at the frequency of the localized circuit.

Another object of my invention is the provision, in an amplifier circuit, of a localized piezo-electric crystal circuit which receives energy from the incoming carrier wave source and which is adapted to control amplifier tubes in such manner that the output of the amplifier tubes is highly selective at the frequency of the crystal circuit.

Another object of my invention is the provision, in an amplifier circuit of a localized resonant circuit comprising tuning elements which receives energy from the incoming carrier wave source and which is adapted to control amplifier tubes in such manner that the output of the amplifier tubes is highly selective at the frequency of the localized resonant circuit.

Another object of my invention is the provision of rendering the amplifier circuit highly sensitive at the time it becomes highly selective.

Other objects and a fuller understanding of my invention may be had by referring to the following description and claims, taken in conjunction with the accompanying drawing, in which:

Figure 1:
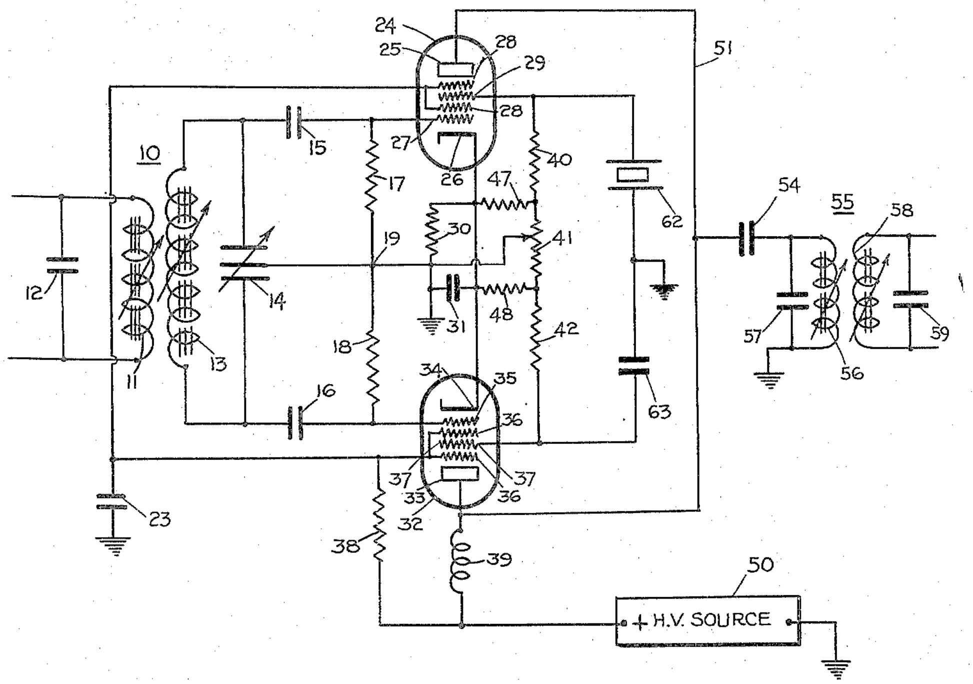
Figure 1 represents a diagrammatic illustration of a circuit embodying the features of my invention.

With reference to Figure 1 of the drawing, the reference character 10 represents a transformer which is adapted to receive the incoming carrier wave frequency. The transformer comprises a primary winding 11 and a secondary winding 13 which is in the form of a variable inductance. A condenser 12 is connected across the primary winding 11 and constitutes, in combination therewith, a resonant circuit which is tuned substantially to resonance at the frequency of the incoming carrier wave source. A variable split condenser 14 is connected across the secondary winding and constitutes, in combination with the secondary winding, a resonant circuit which is tuned to resonance at substantially the frequency of the incoming carrier wave source. The center point of the split condenser 14 is connected to ground.

In my invention, I employ two amplifier tubes 24 and 32. The amplifier 24 comprises a plate 25, a cathode 26, a control grid 27, two screen grids 28 connected together and an injector grid 29 located between the two screen grids 28. The amplifier tube 32 comprises a plate 33, a cathode 34, a control grid 35, two screen grids 36 and an injector grid 37 located between the two screen grids. The upper end of the resonant circuit 13—14 is coupled to the control grid 27 of the tube 24 by a blocking condenser 15 and the lower end of the resonant circuit 13—14 is connected to the control grid 35 of the tube 32 by a blocking condenser 16. The resistors 17 and 18 are grid resistors for the control grids 27 and 35 respectively. The center point 19 of the resistor grids 17 and 18 is connected to ground. The cathodes 26 and 34 of the two amplifier tubes are connected to ground through a cathode biasing resistor 30. The cathodes are by-passed to ground for high frequency through the by-pass condenser 31. The resistors 40 and 42 are grid resistors for the injector grids 29 and 37 respectively. The adjustable resistor 41 is an adjustable biasing resistor for the two injector grids 29 and 37. The resistors 47 and 48 are bias load resistors for the injector grids 29 and 37. The screen grids 28 of the tube 24 and the screen grids 36 of the tube 32 are by-passed to ground for radio frequency by the by-pass condenser 23. The two plates 25 and 33 of the two amplifier tubes 24 and 32 respectively are connected together by a common conductor 51. The output from the two tubes is connected to an output transformer 55 by means of a blocking condenser 54. The output transformer comprises a primary winding 56 and a secondary winding 58. The primary winding 56 has a condenser 57 connected thereacross and comprising, in combination with the primary winding 56, a resonant circuit which is tuned substantially to the frequency of the incoming carrier wave source. The secondary winding 58 has a condenser 59 connected thereacross and the condenser, in combination with the secondary winding, constitutes a resonant circuit which is also tuned to resonance substantially at the frequency of the incoming carrier wave source. The two plates 25 and 33 are connected to a high voltage source 50 through a high frequency choke 39. The resistor 38 is a screen dropping resistor. The injector grid 29 is connected to ground through a piezo-electric crystal 62 and the injector grid 37 is connected to ground through a high frequency condenser 63.

The amplifier circuit as described may be characterized as a push-pull input and a parallel output. Except for the crystal 62, the output from the two amplifier tubes would cancel each other. The function of my circuit with the crystal 62 connected as shown may be described as follows: when the tube 24 attempts to pass current between the cathode 26 and the plate 25, the flow of the electrons there-between excites the injector grid 29, which, in turn, excites the crystal 62 and causes the crystal 62 to oscillate at its natural frequency. The characteristic of a crystal is such that it has a high Q or a low dissipation factor. In other words, the crystal 62 has a high responsive characteristic to its own natural frequency. The oscillations of the crystal are impressed upon the injector grid 29 and thus during the period when the crystal excites the injector grid 29 the tube 24 becomes substantially inoperative so far as the plate being able to receive electrons from the cathode at the frequency of the crystal. The tube 32 functions normally and is not influenced by the excitation from the crystal 62. Thus, the resultant output from the two plates 25 and 33 of the tubes, which is fed to the output transformer 55, is the differential between the current passed by the two tubes. Inasmuch as the tube 24 is non-conducting at the frequency of the crystal, then the resultant voltage imposed upon the output circuit has the characteristic similar to the response characteristic of the crystal 62. The crystal 62, in combination with the injector grid 29, may be characterized as a localized circuit which receives energy from the incoming carrier wave source and utilizes the received energy as a method of control upon the tube 24, whereby its output at the frequency of the crystal is cut off, while at the same time the output of the tube 32 is not cut off, so that a differential voltage is produced for exciting the output transformer 56. This output voltage, since it is responsive to the frequency of the crystal 62, is highly selective.

Figure 2:
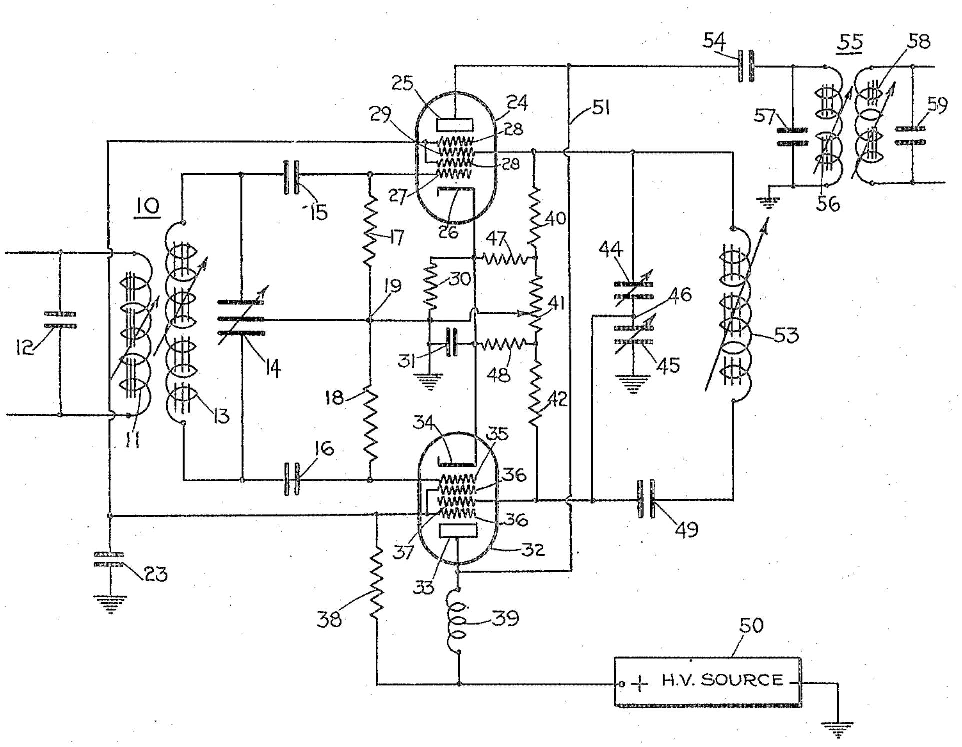
Figure 2 shows a modification of the circuit in Figure 1.

In Figure 2, I show a modification of my invention, and in this circuit the crystal 62 is replaced by a tuned resonant circuit having a relatively high Q in combination with the two tubes 24 and 32. The localized resonant circuit includes the two condensers 44 and 45 and the variable inductance 53. The center tap 46 of the two condensers 44 and 45 is connected to the injector grid 37 and to the inductance 53 through the blocking condenser 49. The operation of the localized resonant circuit comprising the elements 44, 45 and 53 in combination with the two tubes functions substantially the same as the crystal 62 functioned in Figure 1, except that the localized resonant circuit is constructed to be regenerative and respond to the push-pull incoming energy and thereby causes the two tubes to have a higher amplification factor, as the localized resonant circuit inversely affects the tubes. The action of the localized resonant circuit blocks the passage of energy through the tube 24 at the frequency to which the localized resonant circuit is tuned and at the same time causes the tube 32 to become more conductive, with the result that the differential output between the two tubes is greater The injector grid 29 has a higher impedance to ground than the injector grid 37 and they are at opposite phase with respect to each other. The injector grid 29 has a higher impedance to ground because it is connected on the high impedance side of the localized resonant circuit, whereas the injector grid 37 is connected on the low impedance side of the localized resonant circuit. With respect to Figure 1, the injector grid 29 has a higher impedance to ground than the injector grid 37. Instead of the injector grid 37 in Figure 1 having an opposite phase to the injector grid 29 as in Figure 2, it is held at ground potential by the condenser 63. The selectivity of the circuit in Figure 2 may be varied by adjusting the ratio of the condenser 44 to that of 45. The adjustment of the resistor 41 constitutes a vernier adjustment for selectivity by inversely adjusting the bias between the two injector grids.

Although I have shown and described my invention with a certain degree of particularity, it is understood that changes may be made therein without departing from the spirit of the invention which are included within the scope of the claims hereinafter set forth.

I claim as my invention:

1. A selective amplifier circuit, including, a source of radio frequency, first and second amplifier means each having a plate, a cathode, a control grid and an injector grid, input means for exciting said control grids in push-pull from said source of radio frequency, means for interconnecting said cathodes, a cathode biasing resistor for connecting said interconnected cathodes to ground, an output circuit having one end connected to ground, connection means for interconnecting said plates, connection means for connecting said interconnected plates to the other end of said output circuit, and a localized resonant circuit connecting one of said injector grids to ground and a condenser connecting the other injector grid to ground.

2. A selective amplifier circuit, including, a source of radio frequency, first and second amplifier means each having a plate, a cathode, a control grid and an injector grid, input means for exciting said control grids in push-pull from said source of radio frequency, means for interconnecting said cathodes, a cathode biasing resistor for connecting said interconnected cathodes to ground, an output circuit having one end connected to ground, connection means for interconnecting said plates, connection means for connecting said interconnected plates to the other end of said output circuit, and a localized resonant circuit connecting one of said injector grids to ground and a condenser connecting the other injector grid to ground, said localized resonant circuit including a piezo-electric crystal.

3. A selective amplifier circuit, including, a source of radio frequency, first and second amplifier means each having a plate, a cathode, a control grid and an injector grid, input means for exciting said control grids in push-pull from said source of radio frequency, means for interconnecting said cathodes, a cathode biasing resistor for connecting said interconnected cathodes to ground, an output circuit having one end connected to ground, connection means for interconnecting said plates, connection means for connecting said interconnected plates to the other end of said output circuit, and a localized resonant circuit connecting one of said injector grids to ground and a condenser connecting the other injector grid to ground, said localized resonant circuit including a combination of capacitive and inductive elements.

4. A selective amplifier circuit, including, a source of radio frequency having first, second and third terminals, first and second amplifier means each having an anode, a cathode, and first and second control elements, input means for exciting said first control elements in push-pull from said first and third terminals of said source of radio frequency, respectively, means for connecting said cathodes to said second terminal of said radio frequency source, an output circuit having one end connected to said second terminal of said radio frequency source, connection means for interconnecting said anodes, connection means for connecting said interconnected anodes to the other end of said output circuit, and a localized resonant circuit connecting one of said second control elements to said second terminal of said radio frequency source and a condenser connecting the other of said second control elements to said second terminal of said radio frequency source.

5. A selective amplifier circuit, including, a source of radio frequency, first and second amplifier means each having an anode, a cathode, and first and second control elements, input means for exciting said first control elements in push-pull from said source of radio frequency, means for connecting said cathodes to said radio frequency source, an output circuit having one end connected to said radio frequency source, connection means for directly interconnecting said anodes, connection means for connecting said interconnected anodes to the other end of said output circuit, a localized resonant circuit connecting one of said second control elements to said radio frequency source, and a condenser connecting the other of said second control elements to said radio frequency source.

6. A selective amplifier circuit, including, an electromagnetic wave source having a given frequency range, first and second amplifier means having a push-pull input from said electromagnetic wave source and a parallel output, an output circuit connected to said electromagnetic wave source and to said paralleled output of said amplifier means, first and second control elements in said first and second amplifier means, respectively, separate from said input and said output, a localized resonant circuit connected to said first control element and to said electromagnetic wave source, said localized resonant circuit having capacity and being tuned to a determinable frequency within said given frequency range to absorb energy of said determinable frequency, and capacitive means connected to said second control element and to said electromagnetic wave source.

7. A selective amplifier circuit, including, an electromagnetic wave source having a given frequency range, first and second amplifier means each having an anode, and first, second and third control elements, input means for exciting said first and second control elements of said amplifier means in push-pull from said electromagnetic wave source, an output circuit having one end connected to said electromagnetic wave source, connection means for interconnecting said anodes and for connecting said interconnected anodes to the other end of said output circuit, and a localized resonant circuit connected to one of said third control elements and tuned to a particular frequency within said given frequency range to absorb energy of said particular frequency.

DONALD L. HINGS.

REFERENCES CITED

The following references are of record in the file of this patent:

UNITED STATES PATENTS

| Number | Name | Date |
|---|---|---|
| 1,890,543 | Holden | Dec. 13, 1932 |
| 2,098,757 | Plebanski | Nov. 9, 1937 |
| 2,186,195 | Dalpayrat | Jan. 9, 1940 |
| 2,205,847 | Crosby | June 25, 1940 |
| 2,226,238 | Doba | Dec. 24, 1940 |
| 2,243,401 | Sturley | May 27, 1941 |
| 2,258,440 | Boucke | Oct. 7, 1941 |
| 2,266,658 | Robinson | Dec. 16, 1941 |
| 2,380,389 | Andrews | July 31, 1945 |